United States Patent [19]

Masaki

[11] Patent Number: 4,984,284

[45] Date of Patent: Jan. 8, 1991

[54] IMAGE PROCESSING APPARATUS

[75] Inventor: Hisaji Masaki, Yokohama, Japan

[73] Assignee: Canon Kabushiki Kaisha, Tokyo, Japan

[21] Appl. No.: 311,405

[22] Filed: Feb. 15, 1989

Related U.S. Application Data

[63] Continuation of Ser. No. 677,735, Dec. 3, 1984, abandoned.

[30] Foreign Application Priority Data

Dec. 9, 1983 [JP] Japan ................................ 58-231454

[51] Int. Cl.⁵ .............................................. G06K 9/00
[52] U.S. Cl. ...................................... 382/48; 358/401; 346/160
[58] Field of Search ........................ 382/48, 61; 355/7; 358/300, 296

[56] References Cited

U.S. PATENT DOCUMENTS

| 4,417,805 | 11/1983 | Kishi | 358/300 |
| 4,435,733 | 3/1984 | Selmiya et al. | 358/300 |
| 4,552,449 | 11/1985 | Wakamatsu et al. | 355/7 |
| 4,556,915 | 12/1985 | Shibata | 358/280 |
| 4,623,935 | 11/1986 | Mukai et al. | 382/48 |
| 4,737,804 | 4/1988 | Ayata et al. | 346/153.1 |
| 4,739,350 | 4/1988 | Arao | 346/160 |

Primary Examiner—Leo H. Boudreau
Attorney, Agent, or Firm—Fitzpatrick, Cella, Harper & Scinto

[57] ABSTRACT

There is disclosed an image processing apparatus capable of image masking and trimming in easier manner for an arbitrary image area. The apparatus is capable of designating an image area and another image area in the first-mentioned image area, and different image processings can be applied to said first and second image areas.

7 Claims, 8 Drawing Sheets

→ SUB-SCANNING DIRECTION

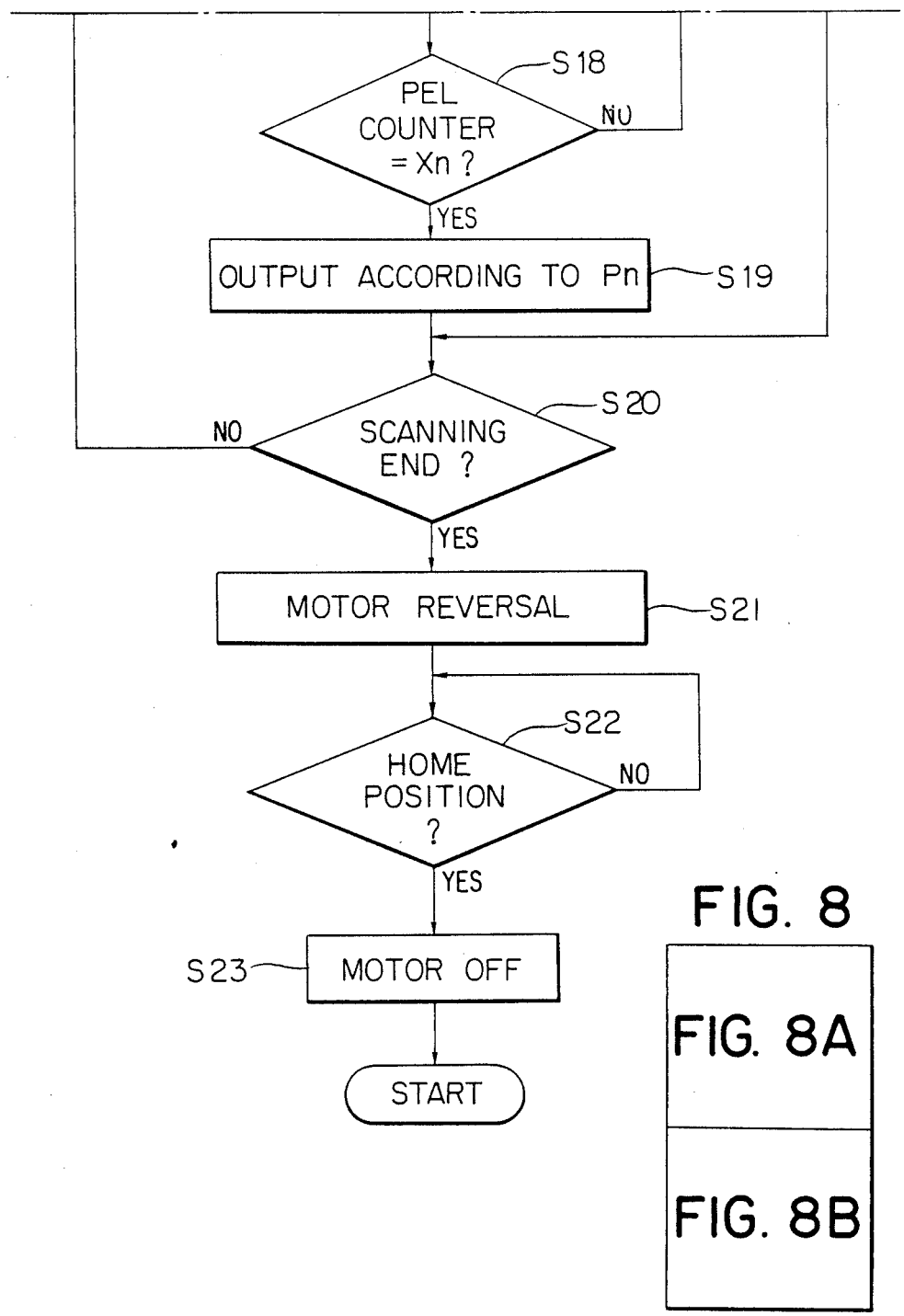

IMAGE PROCESSING APPARATUS

This application is a continuation of application Ser. No. 677,735, filed Dec. 3, 1984, now abandoned.

BACKGROUND OF THE INVENTION

1. Field of the Invention

The present invention relates to an image processing apparatus, and more particularly to an image processing apparatus capable of scanning an original document and releasing the image information as digital information.

2. Description of the Prior Art

Among electrical image processing apparatus, there is already known an apparatus capable of masking or trimming a part of the original image. Such apparatus is, however, capable only of a single process of reproducing a designated image area as white or black.

SUMMARY OF THE INVENTION

In consideration of the foregoing, an object of the present invention is to provide an image processing apparatus capable of easily achieving an arbitrary image processing.

Another object of the present invention is to provide an image processing apparatus capable of achieving an arbitrary image processing in a desired image area.

Still another object of the present invention is to provide an image processing apparatus capable of easy designation of an unnecessary image for the purpose of removal thereof.

Still another object of the present invention is to provide an image processing apparatus adapted for use in a digital copier.

The foregoing and still other objects of the present invention, and the advantages thereof, will become fully apparent from the following description.

DETAILED DESCRIPTION OF THE PREFERRED EMBODIMENTS

Now the present invention will be clarified in detail by description of the preferred embodiments thereof shown in the attached drawings.

Figure 1:
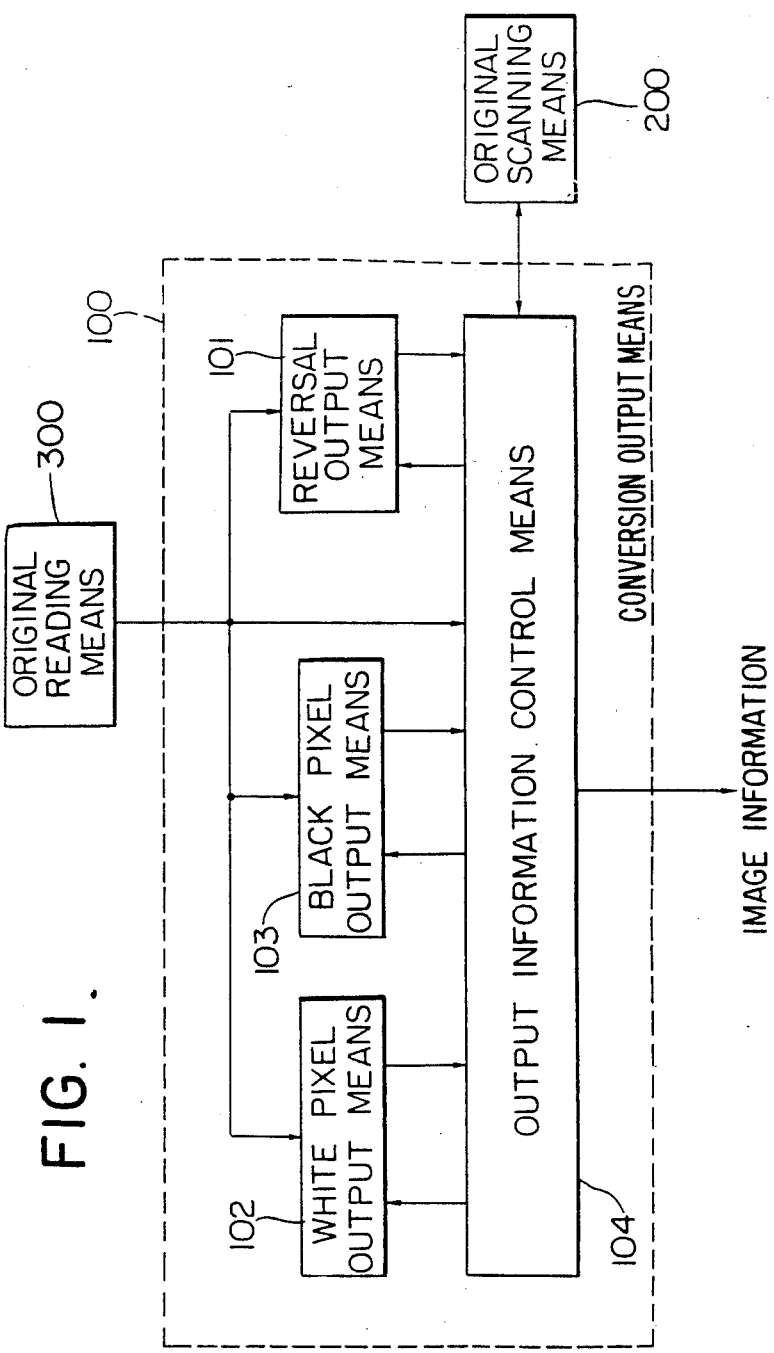
FIG. 1 is a functional block diagram of the apparatus of the present invention.

FIG. 1 is a functional block diagram of the apparatus of the present invention, wherein original scanning means 200 scans an original document, and original reader means 300 photoelectrically reads the original in the course of said scanning and releases image information for each scan line to conversion/output means 100, which supplies said information, after suitable conversion or processing, to an information recording device such as a printer, a display unit, an electronic file, etc.

Said conversion/output means 100 comprises reversal output means 101 for inverting black and white portions of the image information from the original reader means 300; white pixel output means 102 which replaces all the image information with white pixel output signals; black pixel output means 103 which replaces all the image information with black pixel output signals; and output information control means 104 capable of arbitrarily selecting, in one scanning time, either the converted image information from the three output means mentioned above or the unconverted image information, thus constituting an image reading apparatus capable of modifying the output conditions of the image information without employing an image memory.

Figure 2:
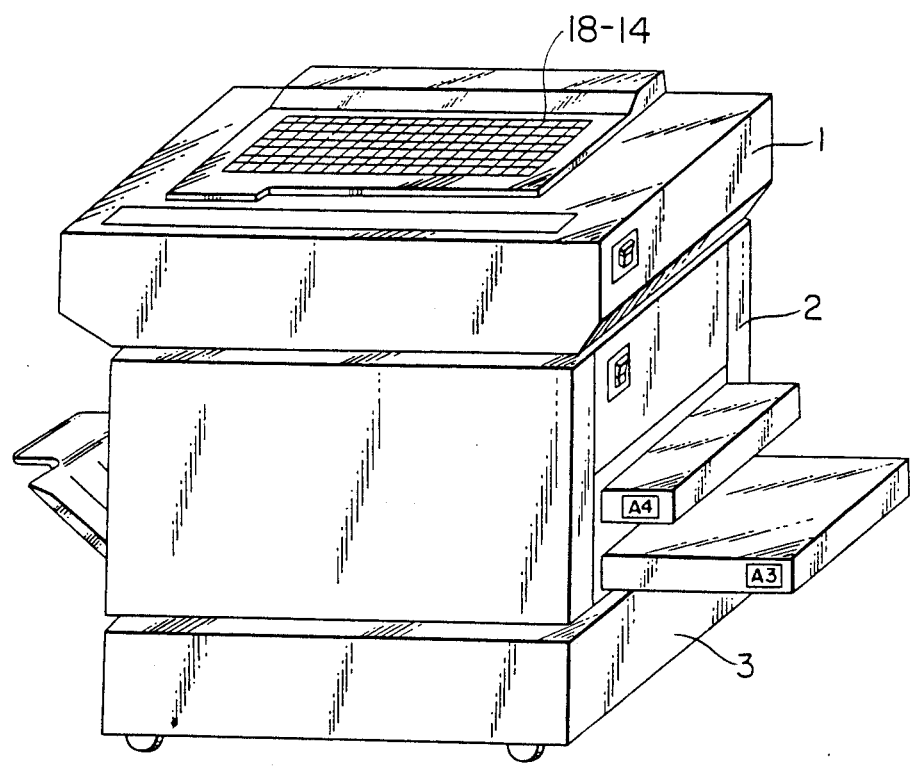
FIG. 2 is an external view of a copier provided with an image reading apparatus 1 embodying the present invention.

FIG. 2 is an external view of a copier composed of an image reading apparatus of the present invention and an image recording apparatus.

In FIG. 2 there are shown an image reading apparatus 1 embodying the present invention, a laser beam printer 2 for image recording on a recording sheet according to the entered image information and a support 3 for the copier. On the upper face of the image reading apparatus there is provided an operation panel for defining the conditions of image reading.

Figure 3:
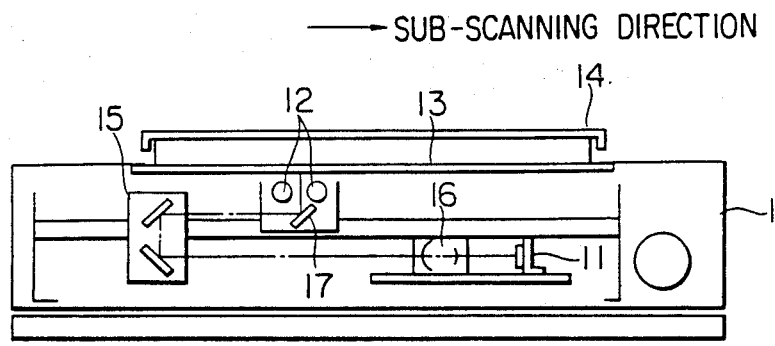
FIG. 3 is a cross-sectional view of the image reading apparatus embodying the present invention.

FIG. 3 show, in a cross-sectional view, the structure of the image reading apparatus embodying the present invention.

In FIG. 3, an original document is placed, with the image bearing face thereof downwards, on an original supporting glass 13 (at the far left corner thereof as seen from the front side of the apparatus), and is pressed against said glass by means of an original cover 14. Said original is illuminated by a fluorescent lamp 12, and there is formed an optical path for guiding the reflected light from the original to the light-receiving face of a charge-coupled device (CCD) 11 containing a linear photosensor array through mirrors 15, 17 and a lens 16, wherein said mirrors 17 and 15 move with a speed ratio of 2:1. The above-described optical unit is moved, by means of a DC servo motor, from left to right at a determined speed to achieve subsidiary scanning. In this manner the image of the entire width of the original can be read in each scanning line. The apparatus can read originals of sizes from A5 to A3, among which originals of sizes A5, B5 and A4 are placed in a longitudinally oblong position while those of sizes B4 and A3 are placed in a laterally oblong position as seen from the front side of the apparatus.

The CCD 11 is therefore required to cover a main scanning width of 297 mm corresponding to the longer side of the A4 size, according to the method of original placement as explained above. In order to obtain a resolving power of 16 pixels/mm, the CCD 11 is required to have 297×16=4752 bits. In the present embodiment, a CCD array sensor of ca. 5,000 bits is therefore employed.

Figure 4:
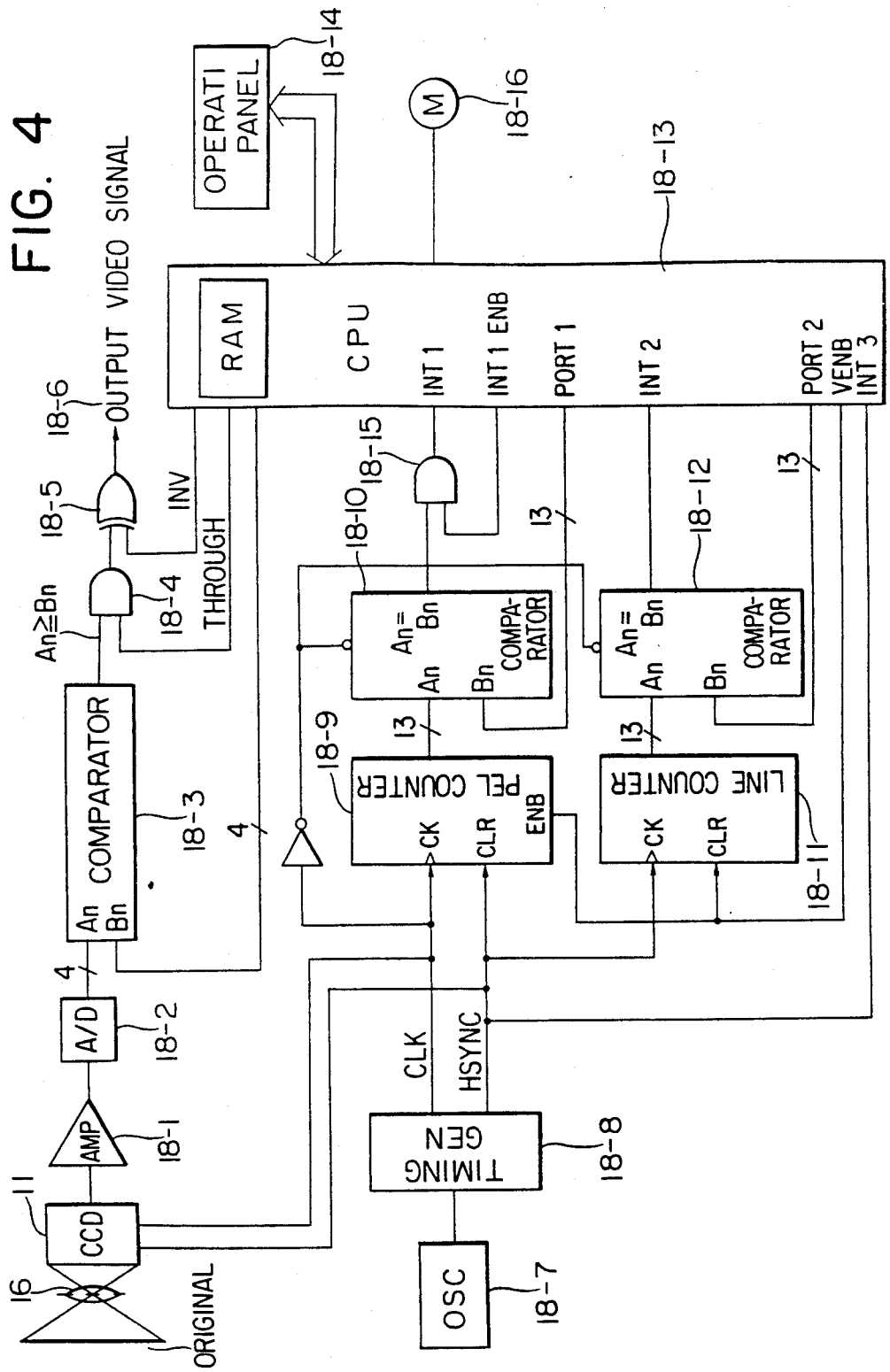
FIG. 4 is a block diagram of a control circuit for the image reading apparatus embodying the present invention.

FIG. 4 shows, in a block diagram, a control circuit for use in the apparatus shown in FIG. 3.

In FIG. 4 there are shown a CCD 11 which is the same as shown in FIG. 3; an amplifier 18-1; an analog-to-digital (A/D) converter 18-2 for releasing a digital density signal of 4 bits in response to the output analog signal from the CCD 11; and a comparator 18-3 for comparing, for each pixel, the output signal of the A/D converter 18-2 with a determined threshold value of 4 bits to generate a white level signal "0" for a pixel identified as white or a black level signal "1" for a pixel identified as black. Hereinafter the signal released from said comparator 18-3 will be called a video signal 18-6. An AND circuit 18-4 receives the video signal from the comparator 18-3 and a signal THROUGH from a central processing unit (CPU) 18-13, and transmits said video signal to an exclusive OR circuit 18-5 when said signal THROUGH is "1", or releases a "0" signal when said signal THROUGH is "0". Said exclusive OR circuit 18-5 transmits the input signal from the AND gate 18-4 when a signal INV from the CPU 18-3 is "0", or inverts said input signal from the AND gate 18-4 when said signal INV is "1".

There are further shown a clock oscillator (OSC) 18-7 for generating main scan read-out clock signals; a timing generator 18-8 for generating timing signals for the entire apparatus; a picture element counter 18-9 of 13 bits for identifying the pixel currently being processed by counting the main-scan read-out clock signals CLK supplied from the timing generator 18-8, said counter being reset at the start of each scanning line by a signal HSYNC to be released by the timing generator 18-8 for a period of a read-out clock signal at the start of each scan line; a second comparator 18-10 for comparing a count output signal of a width of 13 bits from said picture element counter 18-9 with a signal of 13 bits from a port 1 of the CPU 18-13 to release, when both signals are same, an output signal "1" as an interruption signal INT 1 to the CPU 18-13; a line counter 18-11 and a third comparator 18-12 functioning in a similar manner as the picture element counter 18-9 and the comparator 18-10, where said counter 18-11 identifies the subsidiary scan line in processing in the subsidiary scanning direction by counting the aforementioned signal HSYNC instead of the clock signal CLK and is reset at the start of a signal VENB indicating a page section of the image; a central processing unit (CPU) 18-13 controlling the various units of the apparatus of the present embodiment; an operation panel 18-14 provided with mode keys, numeral keys, display units etc. for manipulation by the operation; and a scanning motor 18-16 for driving the scanning system in the subsidiary scanning direction as explained before.

Figure 5:
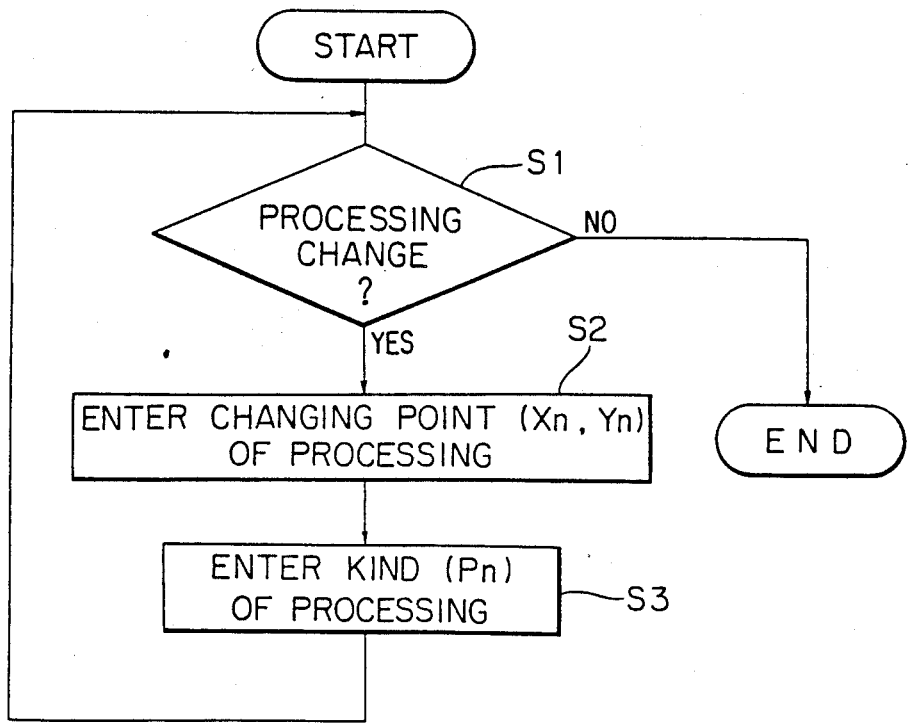
FIG. 5 is a control flow chart for entering a change-over point for the image information processing.

Now reference is made to FIG. 5 for explaining the function of the present embodiment explained in the foregoing.

FIG. 5 shows the procedure for entering the image reading conditions through the operation panel 18-14. At first in a step S1, the operator identifies whether the image reading condition needs a change or not. If not, the procedure is terminated, and the read image is released without change. On the other hand, if a change is requested in the image reading condition, the program proceeds to a step S2 in which the position of said change (Xn, Yn) is entered by means of the keys on the operation panel 18-14. Said position defines the coordinate values on the original supporting glass 13 and can be defined for example with a precision of 1 millimeter. Then a step S3 determines the mode Po of image reading (image without change, reversed image, black image or white image) by the mode keys on the operation panel 18-14. The above-described procedure is repeated for each changing point to define the sets of necessary changing point and corresponding image processing (Xn, Yn, Pn).

The process changing parameters (Xn, Yn, Pn) entered from the operation panel as explained above are stored in a random access memory in the CPU 18-13.

In the following there will be explained an example of defining a first image area and a second image area in said first image area and applying different processes respectively for said first and second image areas.

Figure 6:
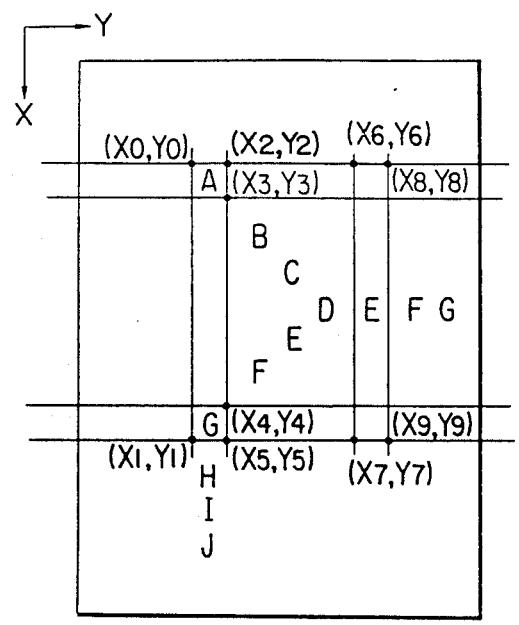
FIG. 6 is a chart showing an example of the change-over point of the image information processing.
Figure 7:
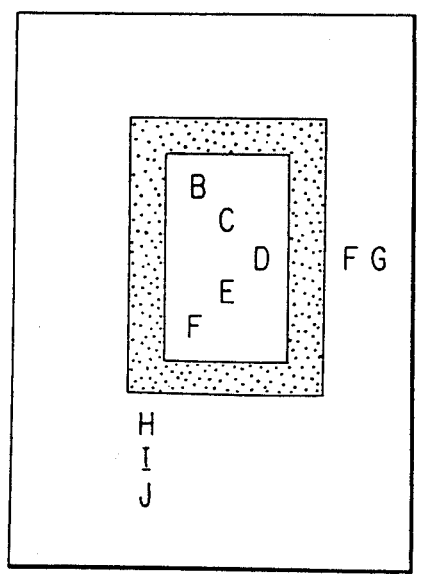
FIG. 7 is a chart showing an example of the information output obtained according to the command shown in FIG. 6.

As an example, a masking process is described in which, as shown in FIG. 7, an image area surrounded by a black frame can be obtained from an original shown in FIG. 6, by releasing a black output signal in an area defined by (X0, Y0), (X1, Y1) to (X2, Y2), (X5, Y5), then releasing the black output signal in sections between (X2, Y2) and (X3, Y3) and between (X4, Y4) and (X5, Y5) while releasing the read image signals in a section between (X3, Y3) and (X4, Y4), and releasing the black output signal in an area defined by (X6, Y6), (X7, Y7) to (X8, Y8), (X9, Y9). In FIG. 6, X and Y respectively indicate the main and subsidiary scanning directions.

Figure 8A:
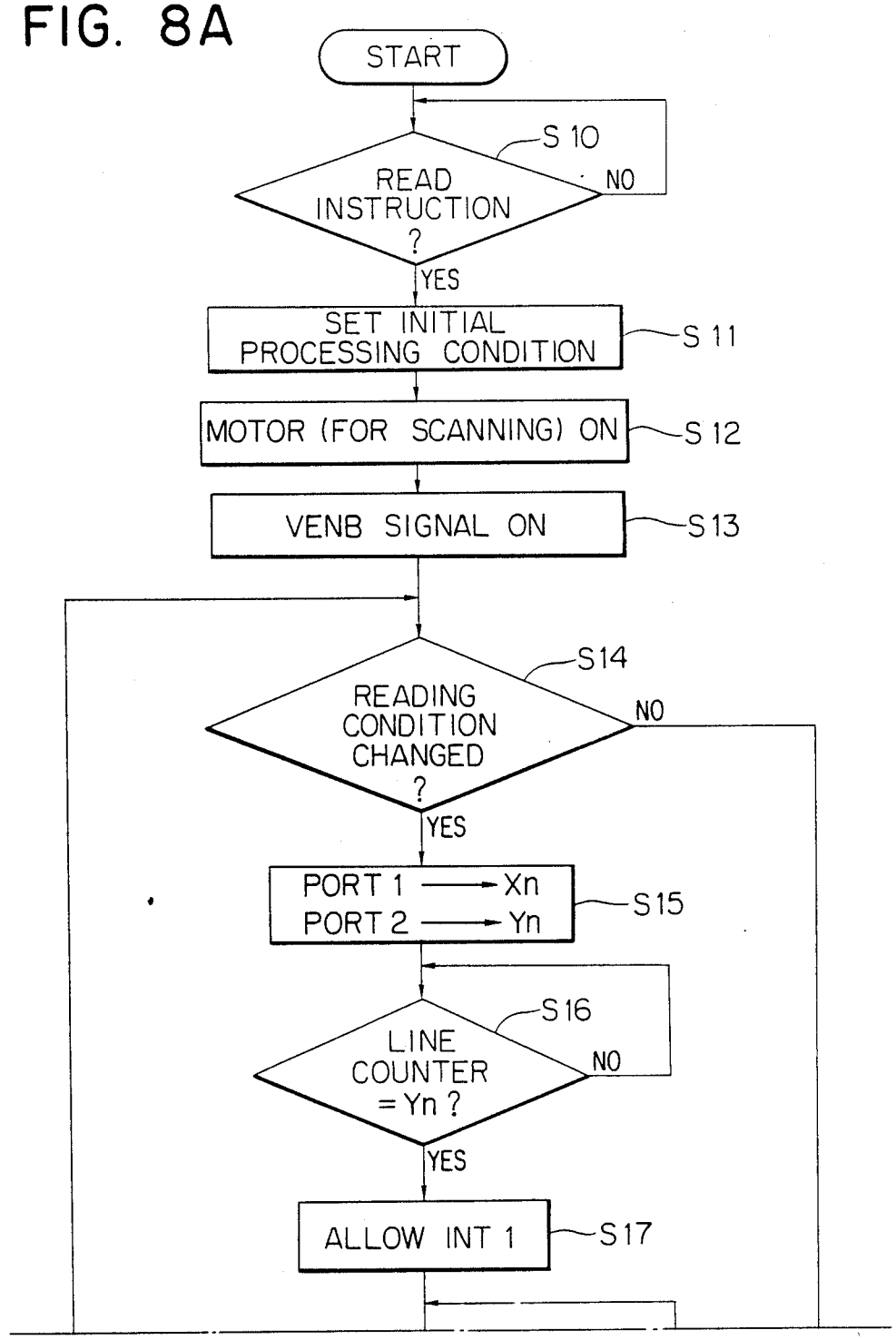
FIG. 8, consisting of FIGS. 8A and 8B, is a flow chart showing the control procedure for the image reading by the apparatus shown above.

Now reference is made to FIG. 8 for explaining the control of the CPU 18-13 for original reading according to the conditions determined as explained above. The control program corresponding to the flow chart shown in FIG. 8 is stored in a read-only memory in the CPU 18-13.

Figure 9:
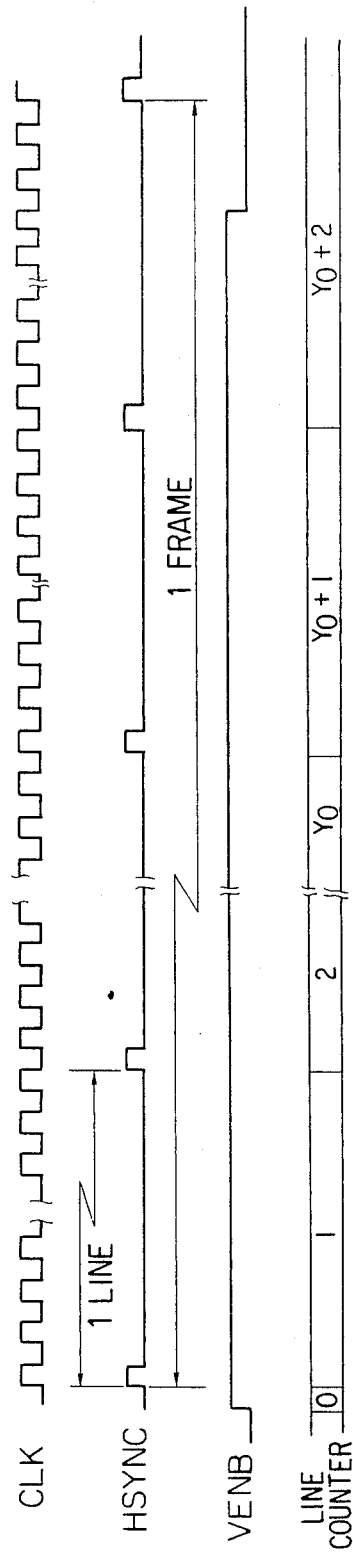
FIG. 9 is a timing chart showing the relation between signals CLK, HSYNC from a timing generator 18-8 and a signal VENB from a CPU 18-13.
Figure 10:
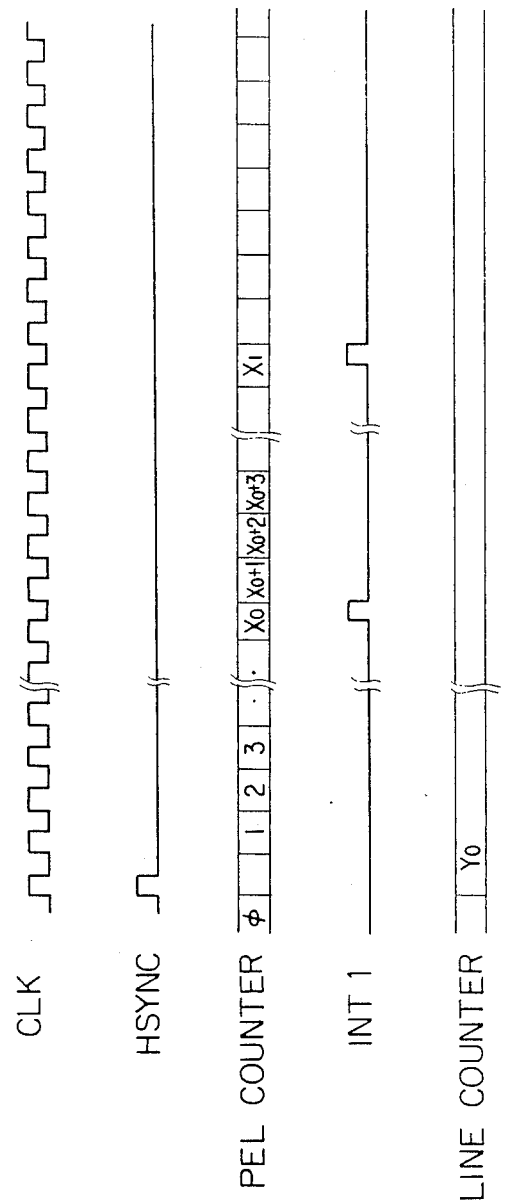
FIG. 10 is a timing chart of an interruption signal INT1.

At first a step S10 awaits a command for starting the image reading, to be entered for example by a start switch on the operation panel 18-14. Then a step S11 releases the signal THROUGH in a state "1" and the signal INV in a state "0" for obtaining the initial process condition $P_{INT}$, usually for releasing the read information without change, and shifts a signal INT1ENB to "0". Then a step S12 activates the scanning motor 18-16 to initiate the original scanning. Then a step S13 shifts the signal VENB to "1", thus resetting the line counter 18-11 and enabling the counting operation of the picture element counter 18-9, whereby the picture element counter 18-9, already reset by the signal HSYNC, counts the clock signals CLK from the timing generator 18-8, and the line counter 18-11 counts the signals HSYNC supplied for each scan line. FIG. 9 shows the timing of said count-up operation of the line counter 18-11, while FIG. 10 shows the timing of said count-up operation of the picture element counter 18-9.

Then a step S14 identifies the presence of a command for a change in the image reading condition according to the procedure shown in FIG. 5. In the absence of such command, the program proceeds to a step S20. On the other hand, in the presence of said command, the program proceeds to a step S15 to release, from the ports 1 and 2, respectively the cordinate values Xn and Yn stored in the random access memory as explained before. A subsequent step S16 compares, in the comparator C 18-12, the count of the line counter 18-11 with the value Yn from the port 2, and releases an interruption signal INT2 in case these two values mutually coincide. Then a step S17 releases the signal INT1ENB thereby enabling the output from the AND gate 18-15 and enabling the interruption by the signal INT1. A subsequent step S18 compares, in the comparator B 18-10, the count of the picture element counter 18-11 with the value Xn at the port 1, and releases the interruption signal INT1 through the AND gate 18-15 when these values mutually coincide. A subsequent step S19 releases the signals THROUGH and INV according to the determined image reading condition Pn. Table 1 shows the relation between the image reading condition and said signals THROUGH and INV.

TABLE 1

| Image reading condition | Signal THROUGH | Signal INV |
|---|---|---|
| Signal without change | 1 | 0 |
| Signal reversed | 1 | 1 |
| Black pixel signal output | 0 | 0 |
| White pixel signal output | 0 | 1 |

FIG. 10 is a timing chart showing the relation between the count of the picture element counter 18-11 and the interruption signal INT1 in case of obtaining an output as shown in FIG. 7 from an original shown in FIG. 6.

Subsequently the program proceeds to a step S20 for identifying whether the original scanning has been completed, and, if not, returns to the step S14. Then, in the presence of command for a change in the image reading condition, the above-described procedure is repeated by setting data Xn, Yn in the ports 1, 2. When the original scanning is completed, the program proceeds to a step S21 for reversing the scanning motor 18-16, and a step S22 awaits the scanning system to return to a home position. Upon arrival at said home position, the program proceeds to a step S23 for turning off the scanning motor 18-16, whereupon the program returns to the step S10 to await the next command for image reading.

In this manner the image processing as shown in FIG. 7 can be achieved by changing (Xn, Yn, Pn) in succession as explained above, and various image processings, such as a masking process in which a determined image area is surrounded by a white frame of an arbitrary width or a trimming process of extracting an image area and masking a determined area therein with white or black. The data (Xn, Yn, Pn) are released in the increasing order of the values Xn and Yn.

As explained in the foregoing, there is provided an image reading apparatus capable of arbitrarily defining image reading conditions in plural sections in a scanning line, thereby providing arbitrary image output signal on read time basis through a simple circuit.

It is therefore rendered possible to achieve image processing such as masking a desired area in an original image and trimming the image of a desired area in said masked area, or such as trimming a desired area from the original image and masking or erasing the image of a desired area in the thus trimmed area.

In the foregoing embodiment the first and second areas are designated on the original image, but it is also possible to designate the first area by the size or position of the original while designating the second area on the original, thereby masking the image in said second area and the image outside said first area. In this manner it is rendered possible to erase the image in a desired area of the original and to erase the image outside the original, for example the image of the original cover. In this case the designation of the first area may be achieved by an automatic device for identifying the original size.

What I claim is:

1. An image processing apparatus comprising:
   input means for entering image information signals representing a document image;
   adjustable designating means for designating desired image areas of the document image, said designating means being capable of designating a first desired image area, the first image area being only a portion of the document image, and a second desired image area, the second desired image area being within the first desired image area;
   image processing means for processing the image information signals entered via said input means in accordance with the area designation by said designating means, said image processing means being adapted to convert, to predetermined signals, image information signals corresponding to the portion of the first desired image area other than the second desired image area; and
   forming means for forming an image on a recording sheet in accordance with the image information signals from said image processing means, said forming means forming on the same recording sheet the document image outside the first desired image area and the document image inside the second desired image area.

2. An image processing apparatus according to claim 1, wherein said input comprises image reading means capable of reading the document image and generating image information signals.

3. An image processing apparatus according to claim 1, wherein said designating means is operable to designate a desired area using coordinate values for defining the desired image area.

4. An image processing apparatus according to claim 1, wherein said image processing means is adapted to reverse levels of image information signals corresponding to the second desired image area and to the image area other than the first desired image area.

5. An image processing apparatus according to claim 1, wherein said image processing means includes means for identifying whether or not the image information signals entered from said input means corresponds to the area designated by said designating means.

6. An image processing apparatus according to claim 1, wherein the predetermined signals represent a white image or a black image.

7. An image process apparatus comprising:
   input means for entering image information signals representing a document image;
   adjustable designating means for designating desired image areas of the document image, said designating means being capable of designating a first desired image area which is less than all of the document image, and a second desired image area which is entirely within and only a part of the first desired image area;
   image processing means for processing the image information signals entered via said input means in accordance with the area designation by said designating means, said image processing means being adapted to convert, to predetermined signals, image information signals corresponding to the portion of the first desired image area other than the second desired image area; and
   forming means for forming an image according to image information signals from said image processing means.

* * * * *

UNITED STATES PATENT AND TRADEMARK OFFICE
CERTIFICATE OF CORRECTION

PATENT NO.  : 4,984,284

DATED       : January 8, 1991

INVENTOR(S) : HISAJI MASAKI

It is certified that error appears in the above-identified patent and that said Letters Patent is hereby corrected as shown below:

Title Page:

IN [56] REFERENCES CITED

U.S. PATENT DOCUMENTS,
        "4,435,733   3/1984   Selmiya et al." should read
        --4,435,723   3/1984   Seimiya et al.--.

COLUMN 2

Line 37, "information" should read --information,--.
    Line 41, "show," should read --shows,--.

COLUMN 3

Line 55, "operation;" should read --operator;--.

COLUMN 4

Line 19, "described" should read --described,--.
    Line 66, "C 18-12," should read --18-12,--.

COLUMN 5

Line 4, "comparator B" should read --comparator--.
    Line 51, "read time" should read --real-time--.

COLUMN 6

Line 8, "first image area" should read --first desired image area--.
    Line 27, "input" should read --input means--.

UNITED STATES PATENT AND TRADEMARK OFFICE
CERTIFICATE OF CORRECTION

PATENT NO. : 4,984,284

DATED : January 8, 1991

INVENTOR(S) : HISAJI MASAKI

It is certified that error appears in the above-identified patent and that said Letters Patent is hereby corrected as shown below:

COLUMN 6

Line 47, "image process apparatus" should read --image processing apparatus--.

Signed and Sealed this

Seventeenth Day of November, 1992

Attest:

DOUGLAS B. COMER

*Attesting Officer*    *Acting Commissioner of Patents and Trademarks*